Patented July 21, 1931

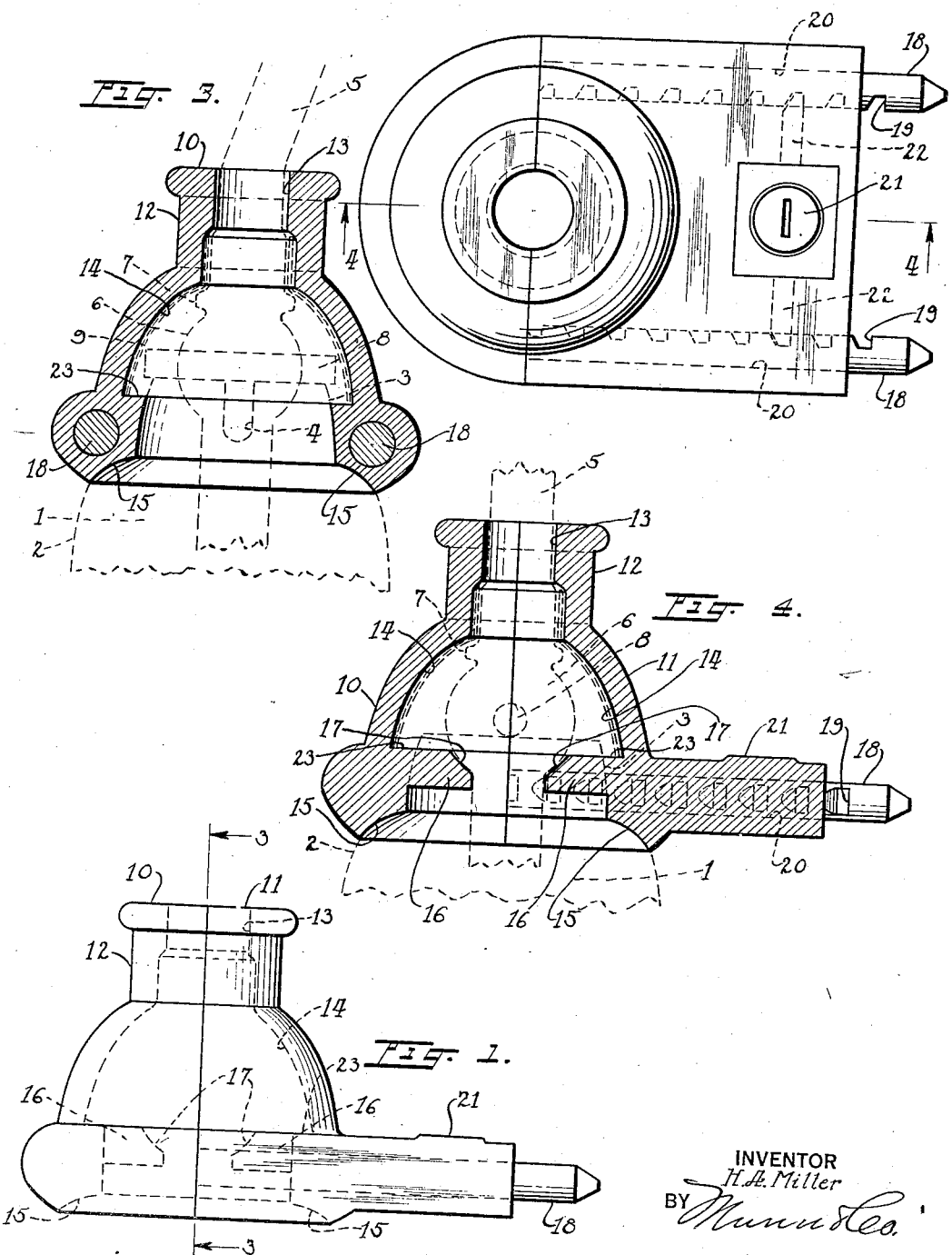

1,815,417

UNITED STATES PATENT OFFICE

HARRY A. MILLER, OF EDMOND, OKLAHOMA

LOCKING DEVICE FOR GEAR SHIFT LEVERS

Application filed June 18, 1928. Serial No. 286,406.

My invention relates to improvements in locking devices for gear shift levers, and it consists in the combinations, constructions, and arrangements herein described and claimed.

An object of my invention is to provide a locking device for a gear shift lever which is designed for a special type of gear shift lever and which has novel means for locking the lever in neutral position.

A further object of my invention is to provide a device of the type described which consists of only two parts, and which may be readily applied to the shifting lever.

A further object of my invention is to provide a device of the type described which has novel means for holding the shifting lever out of operative engagement.

Other objects and advantages will appear in the following specification, and the novel features of the invention will be particularly pointed out in the appended claims.

My invention is illustrated in the accompanying drawings, forming part of this application, in which Figure 1 is a side elevation of my device, Figure 2 is a top plan view of my device, Figure 3 is a section along the line 3—3 of Figure 1, and Figure 4 is a section along the line 4—4 of Figure 2.

In carrying out my invention, I make use of a gear shifting unit 1 which contains a housing 2 provided with a reduced portion 3 which is circular in cross section and which is provided with diametrically opposed slots 4. A gear shift lever or rod 5 extends through the housing 2 and is provided with a ball portion 6. Adjacent the ball portion 6 is an annular flange 7. A guide or pivot pin 8 extends through the ball portion 6 and is adapted to be received in the slots 4. A bell-shaped cover 9 is disposed concentric with the gear shift lever 5 adjacent the annular flange 7 and is arranged to extend over the end of the reduced portion 3 of the housing 2 and over the pin 8.

I provide a locking device which consists of a body portion formed of a male member 10 and a female member 11. The members 10 and 11 are provided with reduced portions 12 having semicircular recesses 13 arranged to receive a portion of the gear shift lever 5 and a portion of the cover 9. The members 10 and 11 are also provided with arcuate-shaped recesses 14 which are adapted to receive the bell-shaped portion of the cover 9.

Supporting surfaces 15 are provided for the members 10 and 11 and are adapted to engage with the housing 2 and rest thereupon when the members are in assembled positions. Locking keys 16 are integral with members 10 and 11 and extend inwardly. The locking keys 16 are provided with arcuate-shaped contacting surfaces 17 for a purpose hereinafter described.

Locking pins or arms 18 are integral with the male member 10 and are provided with lock-receiving recesses 19. Arm-receiving openings 20 are provided in the member 11. A lock 21 of any desired construction is disposed in the member 11 and is provided with catches 22 which are movably disposed in the member 11 and have their ends arranged to extend into the openings 20.

From the foregoing description of the various parts of the device, the operation thereof may be readily understood. The gear shift lever 5 in actual practice is normally held downwardly by means of a spring, not shown, and the guide or pivot pin 8 is receivable in the slots 4. When the shifting lever is in this position, it may be actuated in the ordinary manner to shift the gears of the transmission not shown into the various speeds or gear relations. To disengage the shifting lever from the gear shifting mechanism, the operator may pull upwardly upon the shifting lever against the tension of the spring, not shown, so as to move the pin 8 out of the slots 4. Then by rotating the lever into the position shown in Figure 3, the pin 8 may rest upon the upper surface of the portion 3 of the housing 2. In this position the lever is moved away from and disengaged from the gear shifting mechanism.

The members 10 and 11 of the body portion may then be placed together so that the bell-shaped cover 9 will be received in the recesses 14 so that the lower edge of the cover will be disposed adjacent a shoulder 23 of each of the members 10 and 11. Furthermore, in placing the members 10 and 11 together, the locking arms 18 pass into the openings 20 and the catches 22 of the lock 21 will be received in the recesses 19. In this manner the members 10 and 11 will be automatically locked together. Furthermore, the locking keys 16 will extend through the slots 4 of the housing 2 so as to position the arcuate-shaped surfaces 17 adjacent the ball-shaped portion 6 as shown in Figure 4. The surfaces 15 of the members 10 and 11 will engage with the housing 2 so as to prevent any downward movement of the body portion.

When the members 10 and 11 are locked together in the manner illustrated, the shifting lever 5 is held against downward movement by the cover 9 engaging with the shoulder 23, by the surfaces 15 engaging with the housing 2, and by the pin 8 engaging with the upper surface of the portion 3. The shifting lever is also held against downward movement, due to the fact that the keys 16 extend through the slots 4, thus obviating the possibility of the pin 8 being received therein.

The body portion is also held against displacement by the bell-shaped cover 9 which prevents the movement of the body portion in one direction, and the housing 2 which prevents the movement of the body portion in the opposite direction.

The members 10 and 11 may be readily removed by actuating the lock 21 so as to move the catches 22 out of engagement with the recesses 19. When this has been accomplished, the members 10 and 11 may be moved away from each other so as to remove the locking arms 18 from the openings 20. The shifting lever 5 may then be rotated so as to move the pivot pin 8 into engagement with the slots 4 so that the lever may be moved downwardly and into operative position.

I claim:

1. The combination with a gear shift lever having a pivot pin, a housing having slots arranged to receive said pivot pin, a cover carried by said lever, said lever arranged to be moved outwardly so as to move said pivot pin out of said slots, and means arranged to receive said cover for securing said shifting lever in the outwardly moved position.

2. A device of the type described comprising a body portion composed of a male member, a female member, said members having arcuate-shaped recesses disposed therein for receiving a portion of a gear shifting mechanism, locking keys extending inwardly from said members, locking arms integral with said male member and having locking recesses therein, said female member having openings arranged to receive said locking arms, catches carried by said female member and arranged to extend into the locking recesses in said locking arms, and means for actuating said catches.

3. A device of the type described comprising a body portion composed of a male member, a female member, said members having arcuate-shaped recesses disposed therein for receiving a portion of a gear shifting mechanism provided with a ball-shaped portion, and locking keys extending inwardly from said members and having arcuate-shaped portions arranged to engage with said ball-shaped portion for holding said ball-shaped portion against displacement.

4. A device of the type described comprising a body portion composed of a male member, a female member, said members having arcuate-shaped recesses disposed therein for receiving a portion of a gear shifting mechanism provided with a ball-shaped portion, and locking keys extending inwardly from said members and having arcuate-shaped portions arranged to engage with said ball-shaped portion for holding said ball-shaped portion against displacement when said ball-shaped portion has been moved outwardly.

5. The combination with a housing, a gear shift lever provided with an enlarged fulcrum portion disposed within the housing, and a movable member, of clamping members adapted for being connected with the housing, and means carried by the clamping members and extending within the housing for holding the lever out of operative engagement with the movable member.

6. The combination with a housing, a gear shift lever provided with an enlarged fulcrum portion disposed within the housing, and a movable member, of clamping members, and means for securing said clamping members in locking engagement with the housing, said clamping members being provided with portions extending within the housing and in engagement with the fulcrum portion for holding the lever out of engagement with the movable member.

7. The combination with a housing, a lever adapted for being moved into and out of engagement with a movable member and having an enlarged fulcrum portion disposed within the housing, of means for holding the lever out of operative engagement with the movable member, said means comprising clamping members provided with means for being detachably connected with the housing, said clamping members being provided with inwardly projecting portions adapted for engaging the fulcrum portion of the lever, whereby said lever may be held out of operative engagement with the movable member.

Signed at Edmond, in the county of Oklahoma and State of Oklahoma this 9th day of June, A. D. 1928.

HARRY A. MILLER.